United States Patent
Mlinar et al.

(10) Patent No.: US 10,070,104 B2
(45) Date of Patent: Sep. 4, 2018

(54) IMAGING SYSTEMS WITH CLEAR FILTER PIXELS

(71) Applicant: SEMICONDUCTOR COMPONENTS INDUSTRIES, LLC, Phoenix, AZ (US)

(72) Inventors: Marko Mlinar, Horjul (SI); Brian Keelan, Boulder Creek, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/908,319

(22) Filed: Feb. 28, 2018

(65) Prior Publication Data

US 2018/0192011 A1     Jul. 5, 2018

Related U.S. Application Data

(63) Continuation of application No. 15/343,425, filed on Nov. 4, 2016, now Pat. No. 9,942,527, which is a
(Continued)

(51) Int. Cl.
*H04N 9/04* (2006.01)
*H04N 5/63* (2006.01)
(Continued)

(52) U.S. Cl.
CPC .............. *H04N 9/045* (2013.01); *G06K 9/46* (2013.01); *G06T 3/4015* (2013.01); *G06T 5/10* (2013.01);
(Continued)

(58) Field of Classification Search
CPC ....................................................... H04N 9/045
(Continued)

(56) References Cited

U.S. PATENT DOCUMENTS

| 5,018,006 A | 5/1991 | Hashimoto |
| 6,330,029 B1 | 12/2001 | Hamilton et al. |

(Continued)

FOREIGN PATENT DOCUMENTS

| CN | 101080022 | 11/2007 |
| EP | 2302900 | 3/2011 |

(Continued)

*Primary Examiner* — Joel Fosselman
(74) *Attorney, Agent, or Firm* — Treyz Law Group, P.C.; Michael H. Lyons

(57) ABSTRACT

An image sensor may have an array of image sensor pixels arranged in color filter unit cells each having one red image pixel that generates red image signals, one blue image pixel that generate blue image signals, and two clear image sensor pixels that generate white image signals. The image sensor may be coupled to processing circuitry that performs filtering operations on the red, blue, and white image signals to increase noise correlations in the image signals that reduce noise amplification when applying a color correction matrix to the image signals. The processing circuitry may extract a green image signal from the white image signal. The processing circuitry may compute a scaling value that includes a linear combination of the red, blue, white and green image signals. The scaling value may be applied to the red, blue, and green image signals to produce corrected image signals having improved image quality.

20 Claims, 5 Drawing Sheets

Related U.S. Application Data continuation of application No. 14/871,520, filed on Sep. 30, 2015, now Pat. No. 9,521,380, which is a continuation of application No. 13/736,768, filed on Jan. 8, 2013, now Pat. No. 9,191,635.

(60) Provisional application No. 61/612,819, filed on Mar. 19, 2012.

(51) Int. Cl.
| | | |
|---|---|---|
| *G06T 11/60* | (2006.01) | |
| *H04N 9/73* | (2006.01) | |
| *G06T 5/10* | (2006.01) | |
| *G06K 9/46* | (2006.01) | |
| *G06T 3/40* | (2006.01) | |
| *H04N 9/67* | (2006.01) | |

(52) U.S. Cl.
CPC ............... *G06T 11/60* (2013.01); *H04N 5/63* (2013.01); *H04N 9/67* (2013.01); *H04N 9/735* (2013.01); *G06T 2207/10024* (2013.01); *H04N 2209/041* (2013.01)

(58) Field of Classification Search
USPC .......................................................... 348/279
See application file for complete search history.

(56) References Cited

U.S. PATENT DOCUMENTS

| | | |
|---|---|---|
| 7,688,368 B2 | 3/2010 | Kijima et al. |
| 2008/0068477 A1 | 3/2008 | Iida et al. |
| 2008/0124000 A1 | 5/2008 | Sato et al. |
| 2009/0160992 A1 | 6/2009 | Inaba et al. |
| 2010/0232692 A1 | 9/2010 | Kumar et al. |
| 2010/0302423 A1 | 12/2010 | Adams, Jr. et al. |
| 2011/0187902 A1 | 8/2011 | Adams, Jr. et al. |
| 2011/0188748 A1 | 8/2011 | Adams, Jr. et al. |

FOREIGN PATENT DOCUMENTS

| | | |
|---|---|---|
| JP | H06339145 | 12/1994 |
| JP | 2007520166 | 7/2007 |
| JP | 2007288395 | 11/2007 |
| JP | 2008078922 | 4/2008 |
| JP | 2008187249 | 8/2008 |
| JP | 2009005262 | 1/2009 |
| JP | 2009153013 | 7/2009 |
| JP | 2010509841 | 3/2010 |
| JP | 2011055038 | 3/2011 |

IMAGING SYSTEMS WITH CLEAR FILTER PIXELS

This application is a continuation of patent application Ser. No. 15/343,425, filed Nov. 4, 2016, which is a continuation of patent application Ser. No. 14/871,520, filed Sep. 30, 2015, which is a continuation of patent application Ser. No. 13/736,768, filed Jan. 8, 2013, which claims the benefit of provisional patent application No. 61/612,819, filed Mar. 19, 2012, which are hereby incorporated by reference herein in their entireties. This application claims the benefit of and claims priority to patent application Ser. No. 15/343,425, filed Nov. 4, 2016, patent application Ser. No. 14/871,520, filed Sep. 30, 2015, patent application Ser. No. 13/736,768, filed Jan. 8, 2013, and provisional patent application No. 61/612,819, filed Mar. 19, 2012.

BACKGROUND

This relates generally to imaging devices, and more particularly, to imaging devices with clear image pixels.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels.

Conventional imaging systems employ a single image sensor in which the visible light spectrum is sampled by red, green, and blue (RGB) image pixels arranged in a Bayer mosaic pattern. The Bayer Mosaic pattern consists of a repeating cell of two-by-two image pixels, with two green pixels diagonally opposite one another, and the other corners being red and blue. However, the Bayer pattern does not readily enable further miniaturization of image sensors via smaller image pixel sizes because of limitations of signal to noise ratio (SNR) in the image signals captured from the image pixels.

One means of improving SNR is to increase the available image signal by increasing light exposure at low light levels, where SNR limits the image quality. One conventional method is the use of subtractive filters, in which, for example, red, green, and blue image pixels are replaced by cyan, magenta, and yellow image pixels. However, these signals must generally be converted to RGB or some equivalent output image signal colors to be able to drive most conventional image displays. This transformation generally involves the modification of captured image signals using a color correction matrix (CCM), which can amplify noise, so that the effect of the exposure increase is compromised.

It would therefore be desirable to be able to provide imaging devices with improved means of capturing and processing image signals.

DETAILED DESCRIPTION

Electronic devices such as digital cameras, computers, cellular telephones, and other electronic devices include image sensors that gather incoming light to capture an image. The image sensors may include arrays of image pixels. The pixels in the image sensors may include photo-sensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements. Readout circuitry may include selectable readout circuitry coupled to each column of pixels that can be enabled or disabled to reduce power consumption in the device and improve pixel readout operations.

Figure 1:
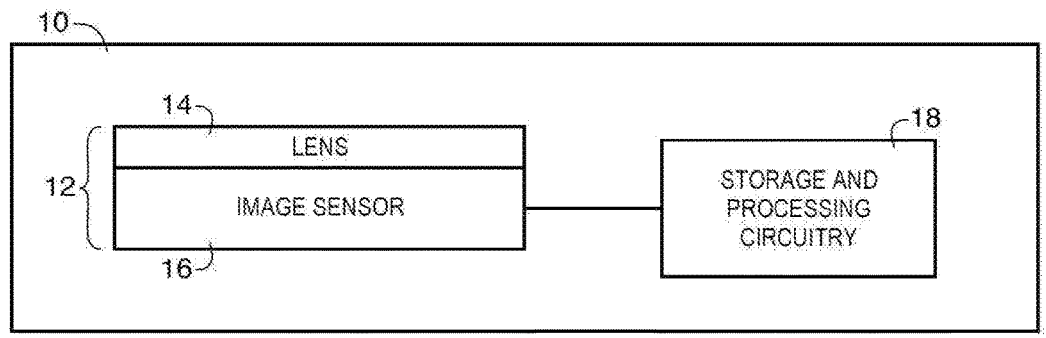
FIG. 1 is a diagram of an illustrative electronic device having an imaging system in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may include circuitry for converting analog pixel data into corresponding digital image data to be provided to processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
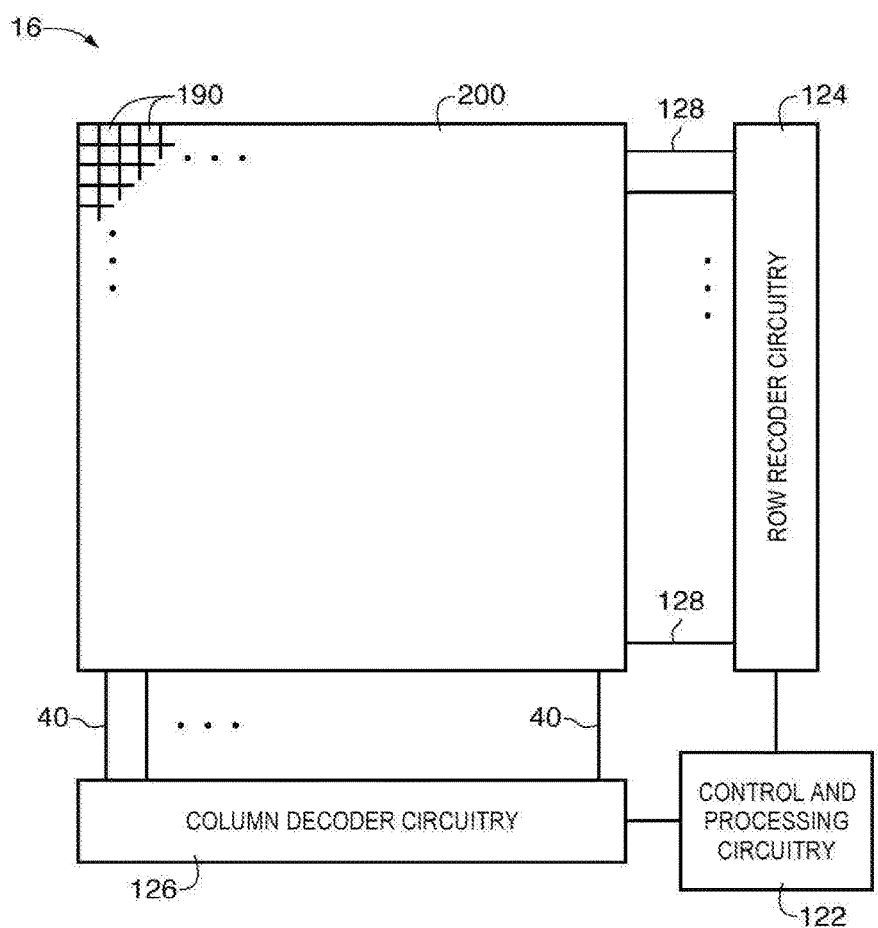
FIG. 2 is a diagram of an illustrative pixel array and associated control circuitry for reading out pixel data from image pixels along column lines in an image sensor in accordance with an embodiment of the present invention.

As shown in FIG. 2, image sensor 16 may include a pixel array 200 containing image sensor pixels 190 (sometimes referred to herein as image pixels 190) and control and processing circuitry 122. Array 200 may contain, for example, hundreds or thousands of rows and columns of image sensor pixels 190. Control circuitry 122 may be coupled to row decoder circuitry 124 and column decoder circuitry 126. Row decoder circuitry 124 may receive row addresses from control circuitry 122 and supply corresponding row control signals such as reset, row-select, transfer, and read control signals to pixels 190 over control paths 128. One or more conductive lines such as column lines 40 may be coupled to each column of pixels 190 in array 200. Column lines 40 may be used for reading out image signals from pixels 190 and for supplying bias signals (e.g., bias currents or bias voltages) to pixels 190. During pixel readout operations, a pixel row in array 200 may be selected using row decoder circuitry 124 and image data associated with image pixels 190 in that pixel row can be read out along column lines 40.

Column decoder circuitry 126 may include sample-and-hold circuitry, amplifier circuitry, analog-to-digital conversion circuitry, bias circuitry, column memory, latch circuitry for selectively enabling or disabling the column circuitry, or other circuitry that is coupled to one or more columns of pixels in array 200 for operating pixels 190 and for reading out image signals from pixels 190. Column decoder circuitry 126 may be used to selectively provide power to column circuitry on a selected subset of column lines 40. Readout circuitry such as signal processing circuitry associated with column decoder circuitry 126 (e.g., sample-and-hold circuitry and analog-to-digital conversion circuitry) may be used to supply digital image data to processor 18 (FIG. 1) over path 210 for pixels in chosen pixel columns.

Image sensor pixels such as image pixels 190 are conventionally provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. However, limitations of signal to noise ratio (SNR) that are associated with the Bayer Mosaic pattern make it difficult to reduce the size of image sensors such as image sensor 16. It may therefore be desirable to be able to provide image sensors with an improved means of capturing images.

Figure 3:
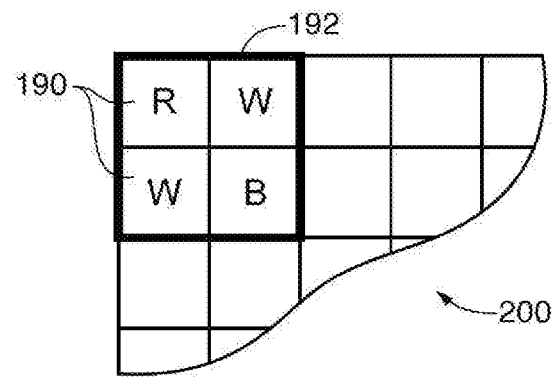
FIGS. 3-5 are diagrams of illustrative pixel unit cells having clear filter pixels in accordance with embodiments of the present invention.

In one suitable example that is sometimes discussed herein as an example, the green pixels in a Bayer pattern are replaced by clear image pixels as shown in FIG. 3. As shown in FIG. 3, a unit cell 192 of image pixels 190 may be formed from two clear image pixels (sometimes referred to herein as white (W) image pixels) that are diagonally opposite one another and adjacent to a red (R) image pixel that is diagonally opposite to a blue (B) image pixel. White image pixels 190 in unit cell 192 may be formed with a visibly transparent color filter that transmits light across the visible light spectrum (e.g., white pixels 190 can capture white light). Clear image pixels 190 may have a natural sensitivity defined by the material that forms the transparent color filter and/or the material that forms the image sensor pixel (e.g., silicon). The sensitivity of clear image pixels 190 may, if desired, be adjusted for better color reproduction and/or noise characteristics through use of light absorbers such as pigments. Unit cell 192 may be repeated across image pixel array 200 to form a mosaic of red, white, and blue image pixels 190. In this way, red image pixels may generate red image signals in response to red light, blue image pixels may generate blue image signals in response to blue light, and white image pixels may generate white image signals in response to white light. The white image signals may also be generated by the white image pixels in response to any suitable combination of red, blue, and/or green light.

Figure 4:
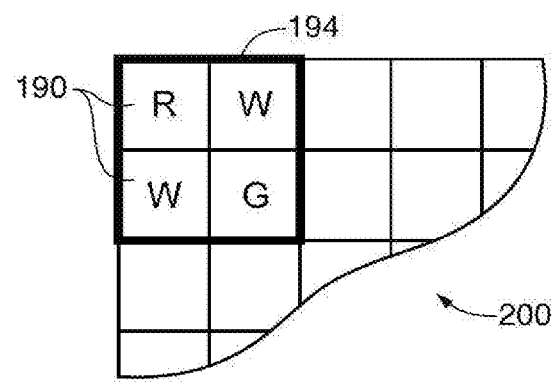
Figure 5:
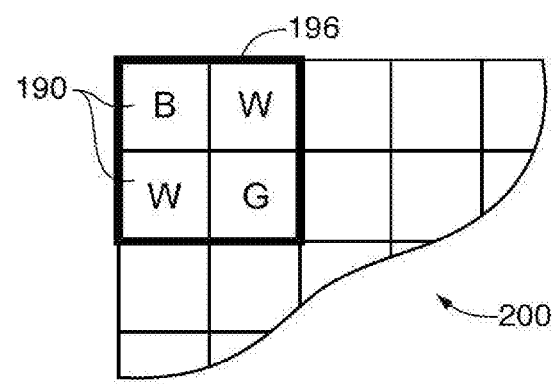

The unit cell 192 of FIG. 3 is merely illustrative. If desired, any color image pixels may be formed adjacent to the diagonally opposing white image pixels in unit cell 192. For example, a unit cell 194 may be defined by two white image pixels 190 that are formed diagonally opposite one another and adjacent to a red image pixel that is diagonally opposite to a green (G) image pixel, as shown in FIG. 4. In yet another suitable arrangement, a unit cell 196 may be defined by two white image pixels 190 that are formed diagonally opposite one another and adjacent to a blue image pixel that is diagonally opposite to a green image pixel, as shown in the example of FIG. 5.

White image pixels W can help increase the signal-to-noise ration (SNR) of image signals captured by image pixels 190 by gathering additional light in comparison with image pixels having a narrower color filter (e.g., a filter that transmits light over a subset of the visible light spectrum), such as green image pixels. White image pixels W may particularly improve SNR in low light conditions in which the SNR can sometimes limit the image quality of images. Image signals gathered from image pixel array 200 having white image pixels (e.g., as shown in FIGS. 3-5) may be converted to red, green, and blue image signals to be compatible with circuitry and software that is used to drive most image displays (e.g., display screens, monitors, etc.). This conversion generally involves the modification of captured image signals using a color correction matrix (CCM). If care is not taken, color correction operations can undesirably amplify noise.

In one suitable arrangement, noise generated by the CCM may be reduced by implementing strong de-noising (e.g., chroma de-noising) prior to applying the CCM to gathered image signals. Chroma de-noising may be performed by processing circuitry 18 (FIG. 1) by applying a chroma filter to image signals gathered by image pixels 190. The chroma filter may serve to increase noise correlation between image signals from different colored image pixels (e.g., red, white, and blue image signals). Increasing noise correlation between image signals from different colored image pixels may reduce noise amplification by the CCM, leading to improved final image quality. In another arrangement, noise amplified by the CCM may be compensated for by applying a so-called "point filter" to the captured image signals. The point filter may use high fidelity white image signals to enhance the quality of red, green, and blue image signals produced using the CCM. If desired, image sensor 16 may implement both chroma de-noising and the point filter to reduce noise amplification by the CCM to yield improved luminance performance in the final image.

Figure 6:
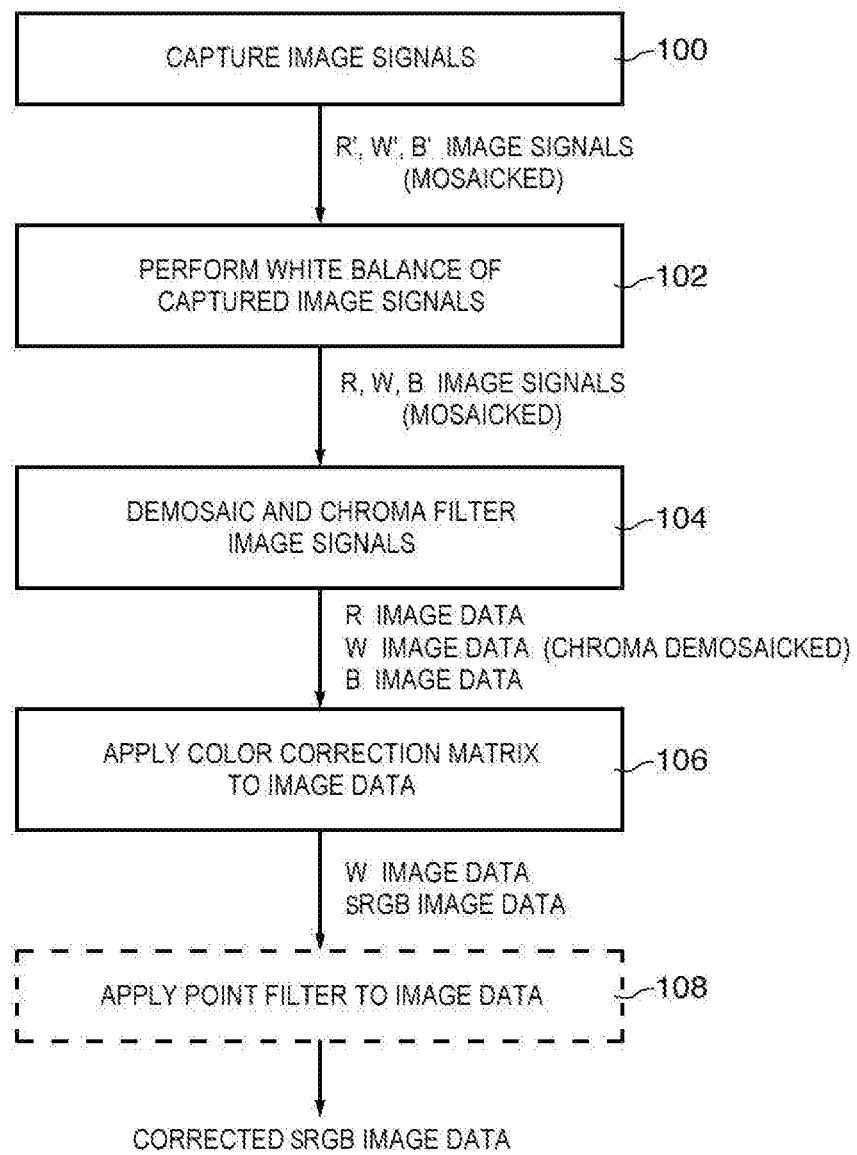
FIG. 6 is a flow chart of illustrative steps that may be performed by processing circuitry in an imaging system to process image signals received from a filtered pixel array in accordance with an embodiment of the present invention.

FIG. 6 shows a flow chart of illustrative steps that may be performed by processing circuitry such as processing circuitry 18 of FIG. 1 to process image signals gathered by a filtered pixel array such as pixel array 200 (e.g., a pixel array that is free of green image pixels). The steps of FIG. 6 may, for example, be performed by processing circuitry 18 to reduce noise in image signals captured using unit cells having white image pixels such as those shown in FIGS. 3-5.

At step 100, image sensor 16 may capture image signals from a scene. The image signals captured by image sensor 16 may include white image signals generated in response to light gathered with the white pixels. If desired, the image signals may also include one or more of red image signals, blue image signals, or green image signals depending on the configuration of image pixels used (e.g., if unit cell 192 of FIG. 3 is used then the image signals may include red, white, and blue image signals, if unit cell 194 of FIG. 4 is used then the image signals may include red, white, and green image signals, etc.). In the example of FIG. 6, red (R'), white (W'), and blue (B') image signals may be captured. The red image signals may have a first spectral response value (an integrated signal power level as a function of the frequency of light received by red image sensor pixels), the blue image signals may have a second spectral response value, and the white image signals may have a third spectral response value that is, for example, greater than seventy five percent of a sum of the first and second spectral response values (e.g., white image signals having a broad sensitivity for an equal energy radiator over the visible light spectrum with standard CIE illuminant E). The image signals may have image values corresponding to light captured by each image pixel 190 (e.g., red image signals may include a red image value, blue image signals may include a blue image value, etc.). The captured image signals may be conveyed to processing circuitry 18 for image processing.

At step 102, a white balance operation may be performed on the captured image signals. In the example of FIG. 6, a white-balanced red image signal (R), white-balanced white image signal (W), and white-balanced blue image signal (B) may be produced.

At step 104, processing circuitry 18 may demosaic and apply a chroma filter to the white-balanced image signals to extract red, white, and blue image data from the white-balanced image signals. The chroma filter may be applied to chroma de-noise the white-balanced image signals. Processing circuitry 18 may, for example, demosaic the image signals and apply the chroma filter simultaneously, sequentially, or in an interspersed manner. This process of applying a chroma filter and demosaicking the image signals may sometimes be referred to herein as "chroma demosaicking." The chroma filter may increase noise correlation between image signals of each color (e.g., noise fluctuations in the red, white, and blue channels may increase or decrease together in a correlated manner). For example, processing circuitry 18 may increase the correlated noise between the red, white, and green image signals to as much as 70% or more of all noise associated with the red, white, and green image signals.

By increasing noise correlation, processing circuitry 18 may reduce the amount of noise amplification generated when a CCM is applied to the image signals. Chroma demosaicking the image signals may allow missing color image signals (e.g., image signals of colors not generated by the image pixels) to be determined from available color image signals. In this example, green image signals may be missing from the gathered image signals because no green color filter is used in unit cell 192 (FIG. 3). A green image signal may be determined using the white, red, and blue image signals (e.g., by performing subtraction operations). In general, any of the primary additive colors (e.g., red, green, and blue) may be determined using the available color image signals. It may be desirable to produce red, green, and blue image signals regardless of the color filters used on image pixel array 200 because display systems often display images using red, green, and blue pixels.

At step 106, processing circuitry 18 may apply a color correction matrix (CCM) to the red image data, white image data, and blue image data. The CCM may, for example, extract green image data from the white image data to generate red, green, and blue image data. For example, the CCM may convert the image data into standard red, standard green, and standard blue image data (sometimes referred to collectively as linear sRGB image data or simply sRGB image data). In another suitable arrangement, the CCM may extract green image data from the red and/or blue image data. If desired, gamma correction processes may be performed on the linear sRGB image data. After gamma correction, the sRGB image data may be used for display using an image display device. In some cases, it may be desirable to provide additional noise reduction (e.g., by applying a point filter to the sRGB image data) to further mitigate the noise amplification generated by applying the CCM to the red, white, and blue image data. Processing circuitry 18 may preserve the white image data for further processing of the sRGB image data during optional step 108.

At optional step 108, processing circuitry 18 may apply a point filter to the image data (e.g., to the sRGB image data produced after applying the CCM to the red, white, and blue image data). The point filter may operate on the sRGB image data to generate corrected sRGB data. The point filter may serve to further reduce noise amplification caused by applying the CCM to the red, white, and blue image data. When displayed using a display system, the corrected sRGB data thereby provide better image quality (e.g., better luminance performance) when compared to the sRGB data prior to applying the point filter.

Figure 7:
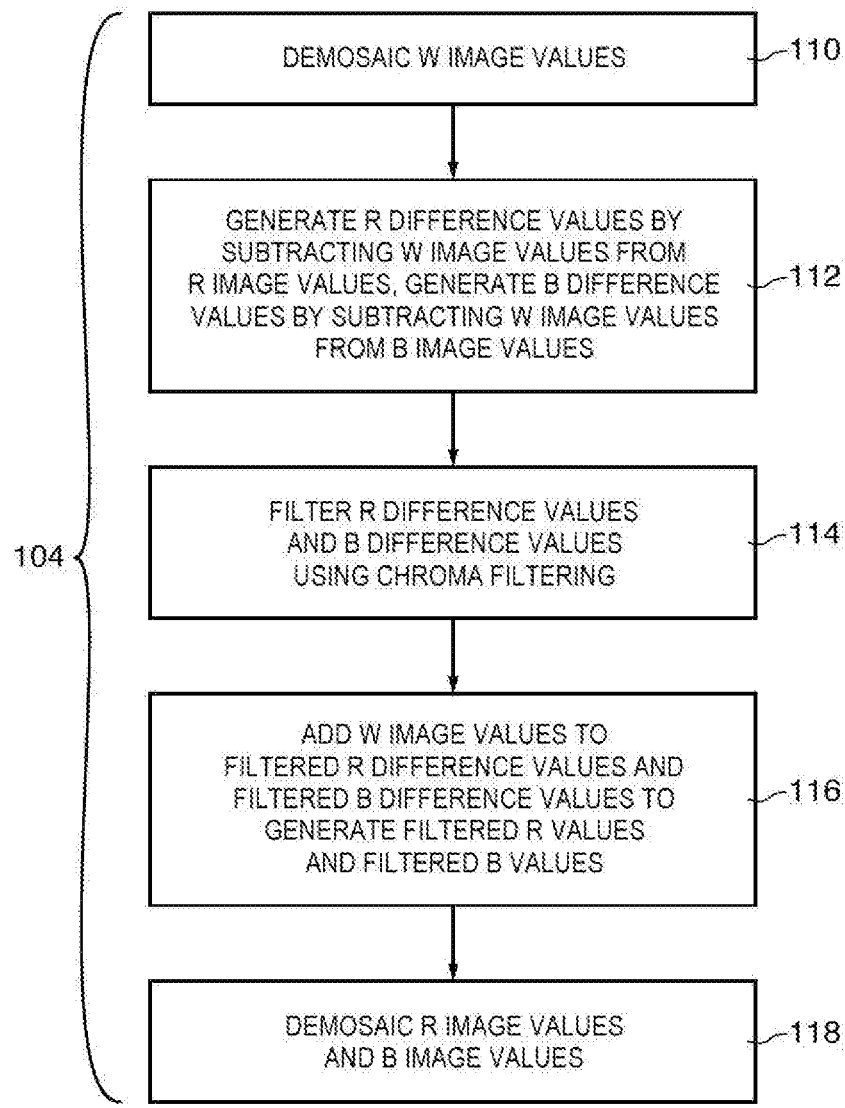
FIG. 7 is a flow chart of illustrative steps that may be performed by processing circuitry in an imaging system to demosaic and filter image signals received from a filtered pixel array in accordance with an embodiment of the present invention.

FIG. 7 shows a flow chart of illustrative steps that may be performed by processing circuitry 18 to demosaic and filter image signals received from image pixel array 200. The steps of FIG. 7 may, for example, be performed by processing circuitry 18 to perform chroma demosaicking on red, white, and blue image signals gathered by image pixels 190 to generate sufficient noise correlation in red, white, and blue image data. The steps of FIG. 7 may, for example, be performed as part of step 104 of FIG. 6.

At step 110, processing circuitry 18 may demosaic the white image signal to produce white image data (e.g., a white image value for each image pixel). In another suitable arrangement, white image values may be produced for a combination of available image pixels 190. The white image values may be used to compute difference values using the red and blue image signals to increase noise correlation between the red, white, and blue image signals.

At step 112, processing circuitry 18 may generate red difference values by subtracting the white image values from the red image values for each pixel. Processing circuitry 18 may generate blue difference values by subtracting the white image values from the blue image values. The red difference values may, for example, be computed for each red image pixel and the blue difference values may be computed for each blue image pixel of image pixel array 200.

At step 114, processing circuitry 18 may filter the red difference values and the blue difference values using a chroma filter. The chroma filter may be applied to the red and blue difference values by, for example, performing a weighted average of difference values computed over a kernel of image pixels 190 (e.g., a weighted average of a group of difference values that were computed by performing step 112). The kernel of image pixels may be defined as a subset of the image pixels in image pixel array 200 over which the chroma filtering is being performed (e.g., the kernel may include some or all of the image pixels in image pixel array 200). For example, when a 5 pixel by 5 pixel kernel is used, a weighted average of difference values is calculated for a 5 pixel by 5 pixel subset of image pixels 190 in image pixel array 200 when performing chroma filtering (e.g., a weighted sum of difference values may be computed for a given image pixel 190 using difference values at 25 surrounding image pixels in image pixel array 200). In general, a kernel of any desired size may be used.

At step 116, the white image values may be added to the chroma filtered red difference values and the chroma filtered blue difference values to generate chroma filtered red image values and chroma filtered blue image values, respectively.

At step 118, processing circuitry 18 may demosaic the chroma filtered red image values and the chroma filtered blue image values to produce red image data and blue image data (e.g., red and blue image data that has been chroma demosaicked) with increased correlated noise. The demosaicked white image data and the chroma demosaicked red and blue image data may then be operated on using the CCM to generate standard red, standard green, and standard blue (sRGB) image data as described above in connection with step 106 of FIG. 6.

FIG. 7 is merely illustrative. If desired, processing circuitry 18 may demosaic the chroma filtered red and blue image values prior to generating the red and blue difference values (e.g., processing circuitry 18 may perform step 118 prior to step 112).

If chroma filtering of the difference values is performed over a sufficiently large kernel of image pixels 190, minimal noise from the red and blue image signals may remain in the red and blue difference values after chroma filtering (e.g., after performing step 114). For example, if the kernel has a size of 15 pixels by 15 pixels or greater, chroma filtering may reduce noise in the red and blue chroma filtered difference values to negligible levels. If desired, the kernel of image pixels 190 may include image pixels located in multiple image pixel arrays 200, image pixels located in multiple image sensors 16, and/or image pixels used during multiple time frames (e.g., to allow for temporal denoising). When the white image values are added to the chroma filtered difference values, noise in the white image values may dominate over noise in the difference values. In this way, noise in the red and blue image data produced at step 116 may be substantially equal to noise in the white image data. Noise in the red and blue image data may thereby be highly correlated, resulting in reduced noise amplification by the CCM. This process may produce less noise amplification by the CCM than when a Bayer pattern is used for image pixel array 200.

The CCM may operate on the red, white, and blue image data to produce linear sRGB data at step 106 (FIG. 6). For example, the CCM may extract information from the white image data to generate the standard green data. The white image data (e.g., the demosaicked white image data produced at step 104) may be preserved after operating on the image data with the CCM. The sRGB image data may be represented in other three-dimensional spaces such as a luminance-chroma-hue (LCH) space. In an LCH space, the luminance channel (L) may be related to the brightness of an image captured by image sensor 16, the chroma channel (C) may be related to the color saturation of an image, and the hue channel may be related to the specific color of the image (e.g., red, purple, yellow, green, etc.). The perception of noise and sharpness in a displayed image may be affected by noise and signal variations in the luminance channel. The SNR in the image data may be improved by transforming the sRGB data to LHC data, replacing a luminance value in the luminance channel with a white image value (which correlates well with overall image brightness due to the broad spectrum of the white image signal), and transforming LHC data back to sRGB data. In this way, noise amplification caused by the CCM may be suppressed in the luminance channel, where noise is particularly noticeable to a viewer when viewing a displayed image.

As described above in connection with optional step 108 of FIG. 6, a point filter may be applied to the linear sRGB data to produce corrected sRGB data using the white image data. The point filter may operate on a single image pixel 190 without information from adjacent image pixels 190, whereas chroma demosaicking may require image signals (e.g., difference values) from multiple image pixels (e.g., a kernel of image pixels) when being applied to image signals at a single image pixel 190. For example, the point filter may operate on a standard red value, standard green value, and standard blue value for each image pixel. To perform point filter operations on the sRGB data, processing circuitry 18 may use the red image data, white image data, and blue image data (e.g., the image data prior to applying the CCM) to compute an original (raw) luminance signal. The original luminance signal may be a linear combination (e.g., a weighted sum) of the white image data, red image data, and blue image data. If desired, the white image data may be weighted more heavily than the red and blue image data in the linear combination. Processing circuitry 18 may compute an implied luminance signal that is a linear combination of the standard red, standard green, and standard blue image data (e.g., after applying the CCM to the image data). If desired, weights in the linear combination used to compute the implied luminance signal may be substantially similar to the weights used to compute the original luminance signal. The weights may be adjusted to modify the "strength" of the point filter (e.g., the degree to which the point filter transforms or corrects the sRGB data).

Processing circuitry 18 may generate a scaling value (e.g., a scaling factor to be applied to color corrected image values) by, in a simplest case, dividing the original luminance signal by the implied luminance signal. If desired, the scaling factor may include a numerator and denominator. The numerator and/or the denominator of the scaling value may include a weighted sum of the original luminance signal and the implied luminance signal. The scaling value may include adjustable weighting parameters that can be varied to adjust the strength of the point filter (e.g., the weighting parameters may be continuously varied to adjust the strength of the point filter from zero to a full strength). To apply the point filter to the sRGB data (e.g., to the standard red, green, and blue image data), processing circuitry 18 may multiply the sRGB data by the scaling value to produce the corrected sRGB data. For example, processing circuitry 18 may multiply the standard red image data by the scaling value, the standard green image data by the scaling value, etc. If desired, the corrected sRGB data may have hue and chroma channels that are approximately preserved from before applying the point filter (e.g., upon conversion of the corrected sRGB data to LCH space). The corrected sRGB data may have improved noise and/or sharpness due to inherited fidelity of the white image signals.

Figure 8:
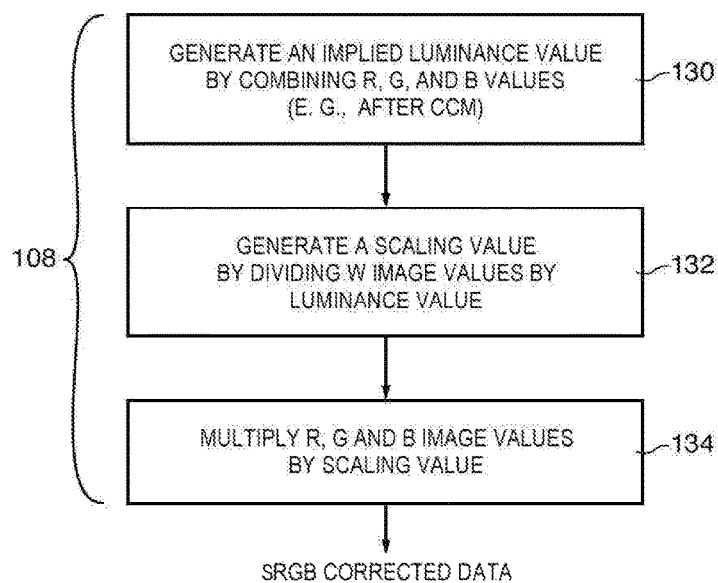
FIG. 8 is a flow chart of illustrative steps that may be performed by processing circuitry in an imaging system to apply a point filter to image signals received from a filtered pixel array in accordance with an embodiment of the present invention.

In a simplest case, the original luminance signal may be approximated by the white image data. FIG. 8 shows a flow chart of illustrative steps that may be performed by processing circuitry 18 to apply a point filter (in the simplest case) to sRGB data after applying the CCM to the red, white, and blue image data (as an example). Processing circuitry 18 may, for example, apply the point filter to sRGB data for each image pixel 190 in image pixel array 200. The steps of FIG. 8 may, for example, be performed as part of step 108 of FIG. 6.

At step 130, processing circuitry 18 may generate an implied luminance value (e.g., a luminance value in LCH space) for a given image pixel 190 by combining the red, green, blue image data (e.g., after applying a CCM). The implied luminance value may, for example, be computed as a linear combination of the red, green, and blue image data.

At step 132, processing circuitry 18 may generate a scaling value by dividing the white image values by the implied luminance value. If desired, the scaling factor may be generated by dividing the white image values by a weighted sum of the implied luminance value and the white image value. The scaling factor may include adjustable weighting parameters that can be varied to adjust the strength of the point filter (e.g., the weighting parameters may be varied continuously to adjust the strength of the point filter from zero to a full strength). The scaling value may, for example, be an operator that operates on the sRGB data.

At step 134, processing circuitry 18 may multiply the sRGB data by the scaling value to produce corrected sRGB data (e.g., corrected standard red, green, and blue image data). For example, processing circuitry 18 may multiply the standard red image data by the scaling value, the standard green image data by the scaling value, etc. The corrected sRGB data may, if desired be provided to an image display. The corrected sRGB data may have improved noise and/or sharpness when compared with the sRGB data prior to applying the point filter.

The examples of FIGS. 6-8 are merely illustrative. Any desired color filters may be used in conjunction with the white color filters shown in FIGS. 3-5 for obtaining color image signals. Any combination of desired color filters may be used (e.g., any combination of red filters, green filters, cyan filters, infrared filters, ultraviolet filters, blue filters, yellow filters, magenta filters, purple filters, etc.). If desired, any other suitable three-dimensional spaces may be used for performing the point filter operation.

If desired, any number of image pixel arrays 200 formed on any number of image sensors 16 may be used to capture images. Each image pixel array used may, for example, be used for image signals of a different color. For example, a first image pixel array may have clear filters for generating white image signals, a second image pixel array may have red filters for generating red image signals, and a third image pixel array may have a blue filter for generating blue image signals. Image signals from each of these arrays may be chroma demosaicked and/or operated on using a point filter. Each image pixel array may, if desired, be formed on a different image sensor in device 10 such as image sensor 16 (e.g., multiple image sensors 16 may be formed in device 10). Such an embodiment may, for example, allow for a shorter camera focal length and a thinner camera module.

Figure 9:
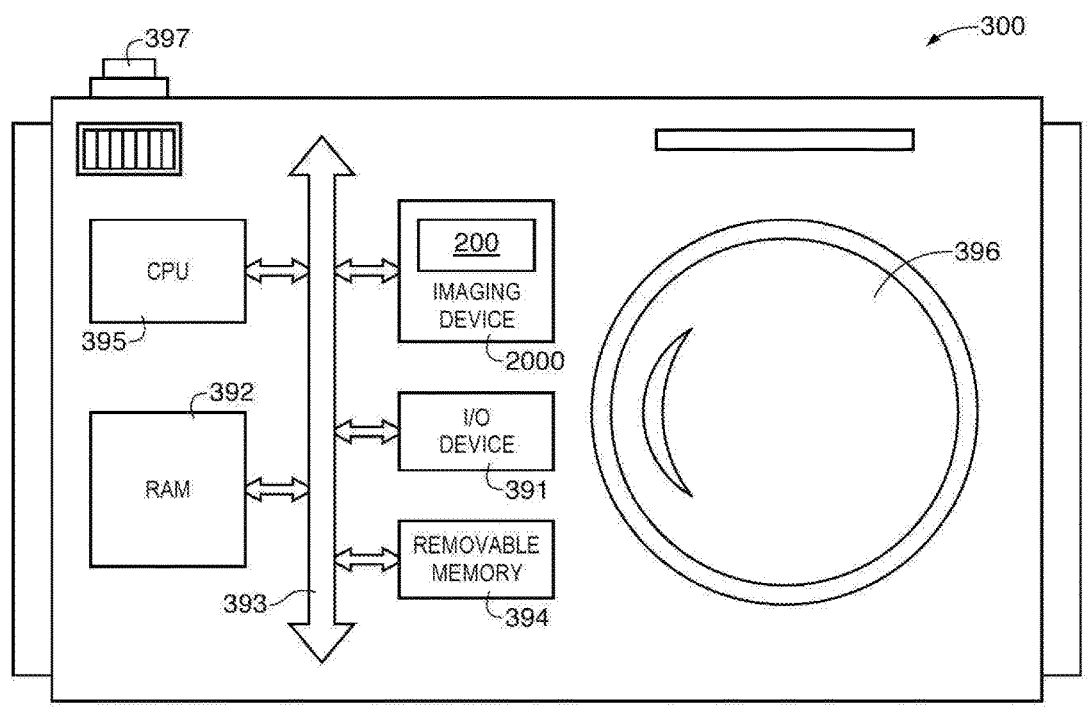
FIG. 9 is a block diagram of a processor system employing the embodiment of FIG. 1 in accordance with an embodiment of the present invention.

FIG. 9 shows in simplified form a typical processor system 300, such as a digital camera, which includes an imaging device 2000 (e.g., an imaging device 2000 such as imaging sensor 16 of FIGS. 1-8 employing clear color filters and the techniques for operations described above). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 200 of device 2000 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating image sensors having clear image pixel filters and image processing techniques (e.g., chroma demosaicking, applying a point filter, etc.) for reducing noise in image signals produced by the image signals.

An image sensor may have an array of image sensor pixels including red image pixels that generate red image signals in response to red light, blue image pixels that generate blue image signals in response to blue light, and clear image sensor pixels that generate white image signals in response to at least red light, green light, and blue light (e.g., white light). The image pixels may be arranged in an array of pixel unit cells each including a number of image pixels of different colors. The image sensor may be coupled to processing circuitry that performs filtering operations on the red, blue, and white image signals to increase noise correlations associated with the red, blue, and white image signals. The processing circuitry may perform filtering operations for a given image pixel by, for example, generating a weighted sum of image signals generated by at least 25 image pixels in the image pixel array. The weighted sum may include adjustable weights (e.g., weights that are adjusted based on observed image features). The weighted sum may be generated for image signals captured during multiple time frames or from multiple image sensors. By generating the weighted sum for multiple time frames, the processing circuitry may reduce the size of the kernel of image pixels while successfully reducing image signal noise.

This example is merely exemplary. In general, the array of image sensor pixels may include image sensor pixels of any desired colors (e.g., image sensor pixels responsive to any color of light). For example, the array of image sensor pixels may include a first group of image sensor pixels responsive to light of a first color, a second group of image sensor pixels responsive to light of a second color, and a third group of image sensor pixels responsive to light of a third color (e.g., red, blue, and white light). The first image signals may have a first spectral response level (e.g., an integrated signal power level as a function of the frequency of light received by the first group of image sensor pixels), the second image signals may have a second spectral response level (e.g., an integrated signal power level as a function of the frequency of light received by the second group of image sensor pixels), and the third image signals may have a third spectral response level (e.g., an integrated signal power level as a function of the frequency of light received by the third group of image sensor pixels). The third image signals may have a spectral response level that is greater than the first and second spectral response levels (e.g., the third spectral response level may be greater than 75 percent of the sum of the first and second spectral response levels). In other words, the third image signals may be captured in response to a broader range of light frequencies than the first and second image signals.

The processing circuitry may, if desired, generate an estimated luminance value (e.g., a luminance value in LCH space) using the first, second, and third image signals. The processing circuitry may generate transformed first, second, and third image signals by transforming the first, second, and third image signals into a derived trichromatic space (e.g., a linear sRGB space, CIE space, XYZ space, Bayer space, etc.). The processing circuitry may, for example, generate the transformed first, second, and third image signals by performing a linear combination of the first, second, and third image signals. The processing circuitry may generate a derived luminance value (e.g., a luminance value in an LCH space) by combining the transformed first, second, and third image signals. The processing circuitry may compare the derived luminance value with the estimated luminance value and modify the transformed first, second, and third image signals so that the derived luminance value approaches the estimated luminance value (e.g., so that the derived luminance value sufficiently matches the estimated luminance value).

The processing circuitry may, if desired, process image data including first image signals of a first color, second image signals of a second color that is different from the first color, and white image signals using an image sensor having processing circuitry. The processing circuitry may generate third image signals of a third color that is different from the first and second colors using the white image signals. The processing circuitry may combine the first image signals, the second image signals, and the third image signals to form a derived luminance value, and may compute an estimated luminance value from the first color image signals, the second color image signals, and the white image signals. The processing circuitry may form the derived luminance value by combining the white image signals with the first, second, and third image signals.

The processing circuitry may modify the first image signals, the second image signals, and the third image signals using the derived luminance value and the estimated luminance value. For example, the processing circuitry may compute a scaling value based on the derived luminance value and the estimated luminance value and may multiply the first, second, and third image signals by the generated scaling value. The processing circuitry may combine the first, second, and third image signals to form the derived luminance value by computing a linear combination of the first, second, and third image signals using weighting factors.

The processing circuitry may, if desired, perform infinite impulse response (IIR) filtering on captured image signals. The processing circuitry may perform IIR filtering by adjusting the filters applied to the captured image signals (e.g., the filters as described in connection with FIGS. 6-8) based on characteristics of the image signals that are captured by image pixels 190. Performing IIR filtering may increase the efficiency with which the processing circuitry processes captured image signals.

The processing circuitry may, if desired, perform white balance operations on the red, blue, and white image signals. The processing circuitry may apply a color correction matrix to the white image signal to extract image signals of a different color such as green image signal from each white image signal. The processing circuitry may combine the red image signals, blue image signals, green image signals, and white image signals to form a luminance value (e.g., by computing a linear combination or weighted sum of the red, blue, green, and white image signals). The processing circuitry may divide the white image signals by the luminance value to generate a scaling value. The processing circuitry may modify the red, green, and blue image signals by multiplying the red, green, and blue image signals by the scaling value. The scaling value may act as a point filter when operating on the red, green, and blue image signals. If desired, any color image pixels may be used in combination with the white image pixels. If desired, the processing circuitry may perform these operations on image signals from multiple image pixel arrays, image pixel arrays on multiple image sensors, and/or image signals captured during multiple time frames.

The clear image pixels and associated filtering techniques may be implemented in a system that also includes a central processing unit, memory, input-output circuitry, and an imaging device that further includes a pixel array, a lens for focusing light onto the pixel array, and a data converting circuit.

The foregoing is merely illustrative of the principles of this invention which can be practiced in other embodiments.

What is claimed is:

1. An imaging system, comprising:
an array of image sensor pixels, wherein the array of image sensor pixels includes first image sensor pixels configured to generate first image signals in response to a first frequency range of light, second image sensor pixels configured to generate second image signals in response to a second frequency range of light, and third image sensor pixels configured to generate third image signals in response to a third frequency range of light; and
processing circuitry, wherein the processing circuitry is configured to perform filtering operations on the first, second, and third image signals by: generating a first difference value based on the first and third image signals, generating a second difference value based on the second and third image signals, applying a filter to the first and second difference values to generate filtered difference values, and adding the third image signals to the filtered difference values.

2. The imaging system defined in claim 1, wherein the processing circuitry is configured to perform the filtering operations by, for each image sensor pixel of the first image sensor pixels, generating a weighted sum of image signals generated by at least 25 image sensor pixels.

3. The imaging system defined in claim 1, wherein the processing circuitry is configured to perform white balance operations on the first image signals, the second image signals, and the third image signals prior to generating the first and second difference values.

4. The imaging system defined in claim 3, wherein the processing circuitry is configured to apply a color correction matrix to the third image signals after generating the filtered difference values, wherein the color correction matrix extracts a fourth image signal of a fourth frequency range from the third image signals.

5. The imaging system defined in claim 1, wherein the third frequency range is broader than the first frequency range and the third frequency range is broader than the second frequency range.

6. The imaging system defined in claim 5, wherein the filtering operations increase noise correlations between the first, second, and third image signals.

7. The imaging system defined in claim 6, wherein the filtering operations increase and decrease noise fluctuations in the first, second, and third image signals together in a correlated manner.

8. The imaging system defined in claim 5, wherein the second frequency range is broader than the first frequency range.

9. An imaging system comprising:
first image sensor pixels that gather first image signals of a first range of frequencies;
second image sensor pixels that gather second image signals of a second range of frequencies;
third image sensor pixels that gather third image signals of a third range of frequencies; and
processing circuitry, wherein the processing circuitry is configured to generate fourth image signals of a fourth range of frequencies using the third image signals, the processing circuitry is configured to combine the first image signals, the second image signals, and the fourth image signals to generate a first luminance value, the processing circuitry is configured to compute a second luminance value based on the first image signals, the second image signals, and the third image signals, and the processing circuitry is configured to modify the first image signals, the second image signals, and the fourth image signals using the first and second luminance values.

10. The imaging system defined in claim 9, wherein the processing circuitry is configured to compute a scaling value based on the first and second luminance values, and wherein the processing circuitry is configured to modify the first image signals, the second image signals, and the fourth image signals by multiplying the first image signals, the second image signals, and the fourth image signals by the scaling value.

11. The imaging system defined in claim 9, wherein the third range of frequencies is broader than the first range of frequencies and the third range of frequencies is broader than the second range of frequencies.

12. The imaging system defined in claim 11, wherein the third range of frequencies is broader than the fourth range of frequencies.

13. The imaging system defined in claim 11, wherein the second range of frequencies is broader than the first range of frequencies.

14. An imaging system comprising:
first image sensor pixels that gather first image signals of a first range of frequencies;
second image sensor pixels that gather second image signals of a second range of frequencies;
third image sensor pixels that gather third image signals of a third range of frequencies that is broader than the first range of frequencies and that is broader than the second range of frequencies; and
processing circuitry, wherein the processing circuitry is configured to generate a luminance signal by performing a weighted sum of the first, second, and third image signals.

15. The imaging system defined in claim 14, wherein the processing circuitry is configured to weight the third image signals more heavily in the weighted sum than the first and second image signals.

16. The imaging system defined in claim 14, wherein the processing circuitry is configured to generate a scaling value by dividing the third image signals by the luminance value.

17. The imaging system defined in claim 16, wherein the processing circuitry is configured to generate corrected image signals by multiplying at least the first and second image signals by the scaling value.

18. The imaging system defined in claim 17, wherein the processing circuitry is configured to generate fourth image signals of a fourth range of frequencies using the third image signals and wherein the third range of frequencies is broader than the fourth range of frequencies.

19. The imaging system defined in claim 14, wherein the processing circuitry is configured to perform filtering operations on the first, second, and third image signals that increase noise correlations between the first, second, and third image signals.

20. The imaging system defined in claim 19, wherein the filtering operations increase and decrease noise fluctuations in the first, second, and third image signals together in a correlated manner.

* * * * *